United States Patent [19]

Ablabutyan

[11] Patent Number: 5,683,221
[45] Date of Patent: Nov. 4, 1997

[54] LIFT PLATFORM WITH CART STOP

[75] Inventor: Karapet Ablabutyan, Los Angeles, Calif.

[73] Assignee: Maxon Industries, Inc., Santa Fe Springs, Calif.

[21] Appl. No.: 272,810

[22] Filed: Jul. 11, 1994

[51] Int. Cl.⁶ ........................................ B60P 1/44
[52] U.S. Cl. ..................... 414/540; 414/545; 410/94
[58] Field of Search ........................... 414/540, 545, 414/556, 557, 921; 187/242, 240, 243, 313; 410/94

[56] References Cited

U.S. PATENT DOCUMENTS

| | | | |
|---|---|---|---|
| 4,007,844 | 2/1977 | Perkins | 414/545 X |
| 4,081,091 | 3/1978 | Thorley | 414/545 |
| 4,251,179 | 2/1981 | Thorley | 414/921 X |
| 4,353,436 | 10/1982 | Rice et al. | 414/540 X |
| 4,420,286 | 12/1983 | Hanson et al. | 414/921 X |
| 4,664,584 | 5/1987 | Braun et al. | 414/921 X |
| 4,854,791 | 8/1989 | Brown | 410/94 X |
| 5,401,135 | 3/1995 | Stoen et al. | 414/921 X |
| 5,433,581 | 7/1995 | Farsai | 414/921 X |
| 5,449,267 | 9/1995 | Ablabutyan | 414/540 |

FOREIGN PATENT DOCUMENTS

| | | | |
|---|---|---|---|
| 480-791A | 4/1992 | European Pat. Off. | 414/545 |
| 480-791B1 | 2/1994 | European Pat. Off. | |
| 2124179 | 2/1984 | United Kingdom | 414/545 |

OTHER PUBLICATIONS

Webster's New International Dictionary of the English Language, 2nd Edition; 1941; 2 pages.

Primary Examiner—Karen B. Merritt
Assistant Examiner—Stephen Gordon
Attorney, Agent, or Firm—Frederick E. Mueller

[57] ABSTRACT

A ramp section for a load platform has one or two elongate rectangular stop plates pivotally mounted in the ramp section adjacent a rear edge of the load surface of the platform. Each stop plate is coaxially fitted with a pawl having an angularly spaced apart pair of lobes. A detent member is pivotally mounted on the ramp section rearwardly adjacent to the pawl and biased into operative alignment therewith for selectively engaging one or the other of the lobes to hold the stop plate in either a retracted position or a stop position. The detent has a foot-operable pedal portion. The stop plate is normally biased into an erect stop position so that initial depression of the pedal effects raising of the stop plate from retracted position to a latched erect position. Upon subsequent depression of the pedal, the other foot of the user is used to force the stop plate into retracted position whereupon release of the pedal effects latching of the stop plate in retracted position.

20 Claims, 4 Drawing Sheets

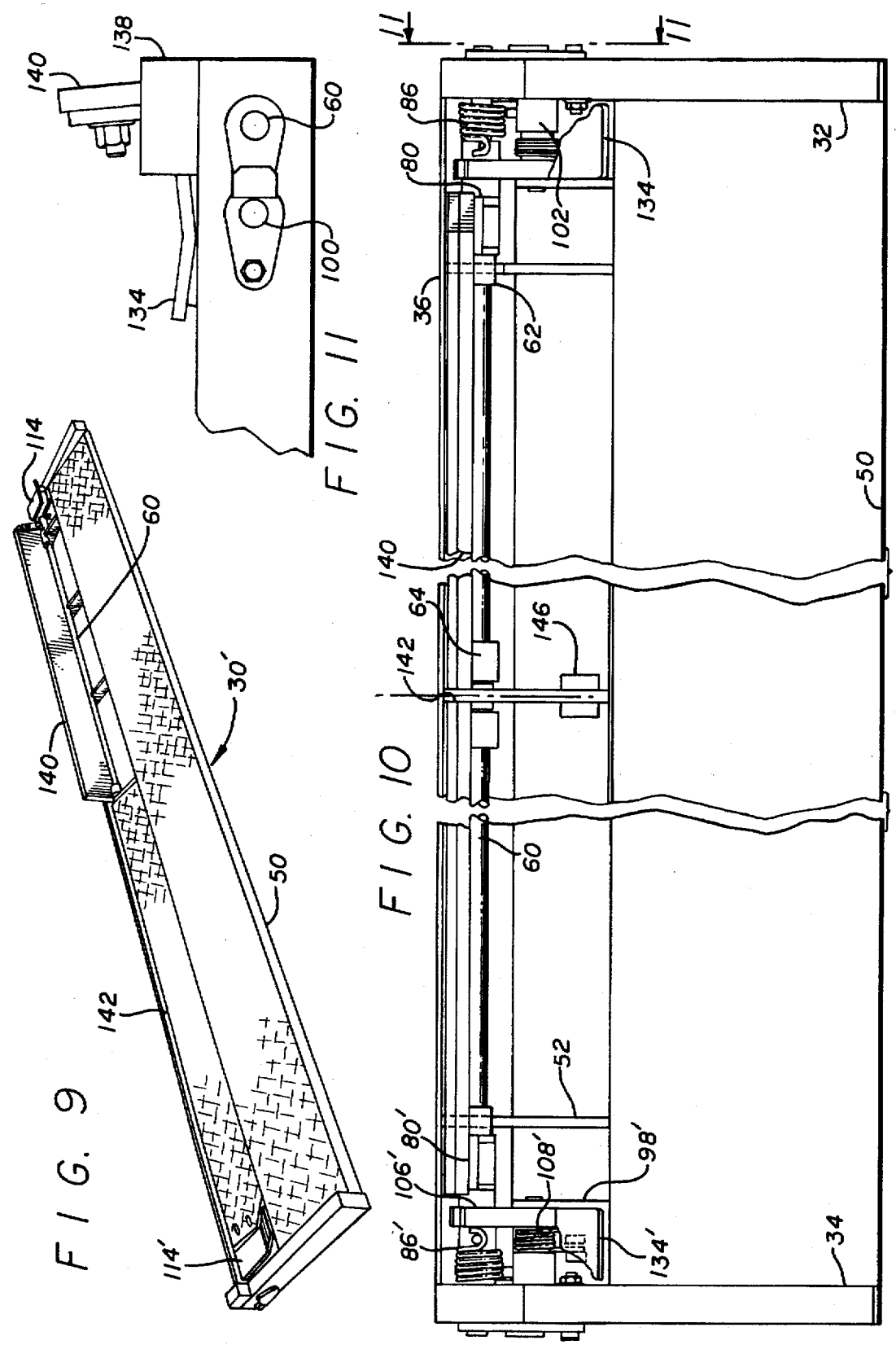

5,683,221

LIFT PLATFORM WITH CART STOP

BACKGROUND OF THE INVENTION

The present invention relates generally to lifts and, more particularly, to an improved cart stop for the loading ramp of the load platform of a liftgate or other load elevator.

Load elevators, e.g., a truck liftgate, may more or less frequently handle freight in the form of wheeled carts. For such usage it is desirable for the rear edge of the platform to be fitted with a loading ramp to define the transition between ground level and the load-bearing upper surface of the load platform. The ramp may be made as a rigid integral extension of the rear edge of the platform or be pivotally mounted to or at the rear edge of the platform. In order to prevent a cart or carts loaded on the platform from rolling rearwardly off the rear edge, it is desirable to provide some form of cart stop to serve as a barrier.

In the prior art, the cart stop may take the form of a retention ramp plate that can be swung between a ramping position and a stowed position overlying the upper surface of the load platform, the device being fitted with a mechanism whereby the plate can be held in an erect barrier-defining position. (An improved form of such retention ramp is disclosed in my copending application Ser. No. 08/242,868 issued Sep. 12, 1995 as U.S. Pat. No. 5,449,267.) In another embodiment, the cart stop comprises an opposite pair of support plates rigidly affixed to and upstanding from the opposite sides of the load platform at its rear edge. The support plates extend rearwardly from the opposite sides of the platform and pivotally support the opposite sides of a unitary tapered loading ramp. The axis of rotation of the ramp parallels the rear edge of the load platform, the pivot mechanism including torsion springs to normally bias the blunt forward edge of the ramp into a cart stop position protruding above the load-bearing surface of the platform. When the platform is lowered, the rearmost beveled edge of the ramp contacts the ground surface to rotate the ramp to a retracted position to bring its forward upper edge into substantially flush proximity with the upper surface of the load platform.

The latter version of the prior art cart stops has the disadvantage that it is not positively locked in the cart stop position, since it is subject to depression against the spring force. Also, as it relies on forcible contact between the tip of the load ramp and ground to effect retraction of the ramp, it is subject to substantial wear and damage. This mechanism also involves protrusion of the support plates above the ramp and load platform.

The prior art retention ramps (i.e., omitting the disclosure of my above-mentioned copending application) typically involve two sets of hardware, surface-mounted on the retention ramp and platform, which present obstacles to the loading and unloading of freight, as well as a tripping danger. The devices are also cumbersome to use, both in manually latching the retention ramp in a stowed position and in effecting the barrier-defining position.

Neither of these two types of cart stop mechanisms can be practically adapted for use as two side-by-side cart stops in curb side and driver's side locations of the platform. Further, both versions come into play whether or not there is any occasion for their use. Specifically, a retention ramp must be unlatched from the stowed position, turned to the ramping position and latched in an erect barrier-defining position whether or not wheeled carts are to be handled. In the other version, the loading ramp pivots between retracted and raised positions without regard to the presence or absence of wheeled carts as cargo.

The present invention obviates the foregoing and other disadvantages of prior art mechanisms.

SUMMARY OF THE INVENTION

The rear edge of the platform assembly of a lift has a tapered loading ramp section rigidly integrated with the platform. The ramp frame comprises a transversely oriented front edge frame member, such as a length of angle iron whose vertical flange abuts and is secured against the transverse rear edge frame member of the platform assembly. At opposite ends of the angle iron a pair of side frame members are rigidly secured, each comprising a tubular member oriented as a linear extension of an opposite side frame member of the platform assembly. The internal framework of the ramp section comprises a plurality of fore- and -aft oriented internal tapered ribs having forward ends welded within the flanges of the angle iron. The aft portion of the ramp section on its underside comprises a sheet metal member formed along its forward edge with an upstanding flange welded to the rear end edges of the ribs and welded at opposite ends to the inside faces of the side frame members. A rearmost portion of the upper ramping surface comprises a substantially rectangular plate having opposite edges secured to the inside faces of the opposite side frame members. A forward portion of the ramp plate is supported on upper edges of the integral transverse flange of the bottom sheet and rear portions of the internal ribs. A transversely extending ramp plate support rod is situated in wedging relationship between the bottom sheet and the ramp plate and held in place preferably by welding to the bottom sheet.

The forward portion of the upper surface of the ramp section comprises an elongate substantially rectangular stop member, e.g., a plate substantially occupying the gap between the forward edge of the ramp plate and the upper edge of the vertical flange of the forward angle iron member. To support the stop plate, the forward edge portion of the ramp section internally mounts a transversely extending support rod fitted at spaced intervals with a plurality of bearing brackets, each having a portion of its periphery secured to the underside of the stop plate. The stop plate is thus rotatable between a retracted position, in which it comprises a substantially flush continuation of the rear ramp plate, and an erect cart stop position confronting the rear edge of the load surface of the platform assembly. The forward end portions of the internal ribs are formed with shoulders providing relief for retraction and erection of the stop plate.

For turning the cart stop to the erect position, the curb side end of the support road is coaxially fitted with a biasing means, such as a torsion spring having one end connected to a pawl body that is rotatably mounted on the rod and drivingly coupled to the stop plate. A locking hook or detent is pivotally mounted on the ramp framework on a pin having an axis parallel to that of the pawl body. The pin pivotally mounting the locking hook is fitted with a torsion spring to normally bias a forward end of the hook into contact with the pawl, the forward end of the hook being formed with a detent notch that is alternatively registerable with either of two angularly spaced apart lobes of the pawl. A rear portion of the locking hook, on the opposite side of the pivot pin from the forward end portion, comprises a foot engagable pedal whereby the hook can be depressed into retracted position to release the cart stop for popping up into the active position. In order to retract the cart stop, the pedal is again depressed with one foot, releasing the detent notch from one of the lobes of the pawl. Thereafter, the operator's other foot is employed to depress the erect cart stop into its retracted position whereupon the pedal is released to allow its detent notch to engage the other lobe of the pawl. The pawl and detent mechanism thus serves as a foot-operable latch means.

In an alternative embodiment, each of the opposite sides of the ramp is fitted with an independently actuatable cart stop through an independent pedal at the corresponding curb side or driver's side of the assembly.

BRIEF DESCRIPTION OF THE DRAWINGS

FIG. 9 is a perspective view of an alternative embodiment of the invention, having a pair of independent, separately operable side-by-side cart stops.

FIG. 10 is a partially broken top plan view of the loading ramp of FIG. 9, but showing both cart stops in the erect position and with portions broken away to show interior details of construction.

FIG. 11 is a partial elevational view taken on line 11—11 of FIG. 10.

DESCRIPTION OF THE PRESENTLY PREFERRED EMBODIMENT

Figure 1:
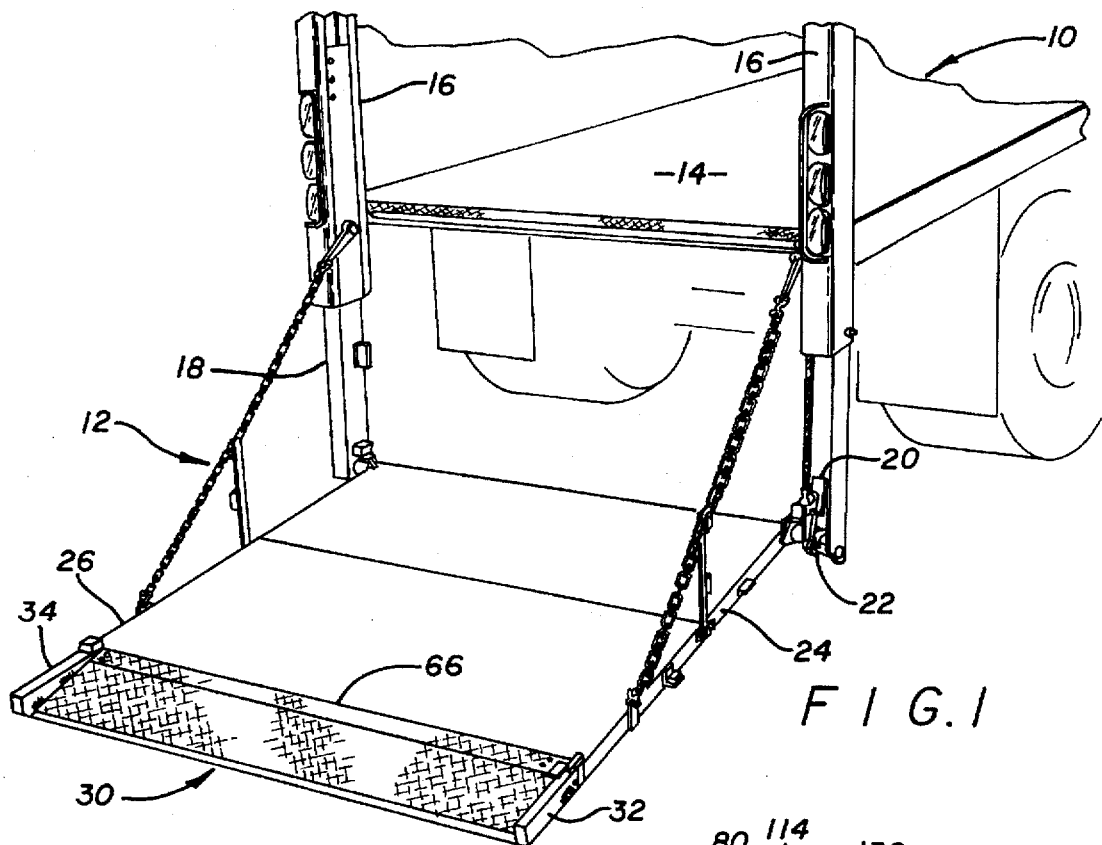
FIG. 1 is a partial perspective view of a liftgate-equipped truck body having a load platform embodying my invention.

Before explaining the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein (e.g., front, rear, top, bottom) is for the purposes of description and should not be regarded as limiting.

FIG. 1 is illustrative of the usual environment of the invention comprising a truck body 10 whose rear end opening is fitted with a liftgate, designated generally by the numeral 12. The liftgate is shown in an operative condition of its platform ready for use in loading and unloading freight between ground level and a bed 14 of the truck body. However, it will be understood that the liftgate is of the usual type whose platform is foldable into a transit position. The liftgate 12 is purely illustrative since the present invention can be employed with any lift, hoist or elevator in which it is desired to have a cart stop or stops to retain wheeled carts on the load platform.

In the illustrated case, the liftgate comprises a fixed pair of opposite side columns 16, each containing a downwardly extendable and retractable runner assembly 18 operatively associated with a power means (not shown). One runner assembly mounts an auxiliary cylinder 20 drivingly coupled to a crank mechanism 22 by means of which the illustrated platform can be actuated between the horizontally extended operative position shown and a vertically collapsed or folded transit position. It will also be understood that the power means of the liftgate 12 effects raising and lowering of the platform, whether folded or open, between ground level and the level of the bed 14 of the truck 10.

The invention is particularly useful with load platforms of large area, such as the illustrated case, wherein the platform comprises a forward platform assembly 24 and a relatively foldable rear platform assembly 26. Such liftgates, e.g., of the general type depicted in U.S. Pat. No. 4,007,844, are frequently used in the loading and unloading of truck bodies at locations not having a loading dock where the cargo, e.g., a wheeled cart or carts, is required to be moved between the truck bed and the raised platform or between the ground and the lowered platform.

Referring to FIG. 1, the ramp section assembly 30 may be made as a separate sub-assembly apart from the platform section 26 or rigidly integrated during the original manufacture of the platform section 26. In either case, it comprises a rigid rearward extension of the platform assembly.

More particularly, the ramp section 30 has a framework comprising curb side frame member 32 and driver's side frame member 34, each having its forward end secured, as by welding, to opposite ends of a front frame member, such as an angle iron 36. The angle iron 36 comprises the front of the assembly and, in the case where the ramp section is made as part of the original manufacture of the platform section 26, may comprise a part of the rear edge frame of the platform section 26. In the illustrated case, the ramp section 30 is assumed to be a separate sub-assembly whose vertical flange 38 is welded or otherwise fixedly secured to the rear edge of the platform section 26. The opposite side frame members 32 and 34, preferably made of square tubing, are thus oriented as rigid linear rearward extensions of the opposite side frame members of the platform section 26.

The rearmost portion of the underside of the ramp section comprises a bottom sheet 44 whose opposite ends are welded to the side frames and whose forward edge is formed into an upstanding flange 46 inclining upwardly. A rear part of the upper surface of the ramp section comprises a substantially rectangular ramp plate 50 having opposite ends and a rear edge welded to the inside surfaces of the side frame members 32 and 34 and rear edge of sheet 44, respectively. The forward edge portion of the ramp plate 50 is supported throughout its width between the side frames by the upstanding flange 46 of the bottom sheet 44 and by the upper edges of a plurality of fore- and -aft oriented laterally spaced apart parallel tapered ribs 52 having rear ends welded to the flange 46. Forward ends of the ribs are welded to the flanges 38 and 40 of the angle iron 36.

A rear edge of the ramp plate overlying the rear edge of the bottom sheet 44 may be beveled, as indicated. If desired, the upper surface of the ramp plate may be formed with a conventional diamond plate finish. In order to reinforce the ramp plate 50 an elongate transverse rod 54 may be disposed within the cavity defined between the ramp plate and the bottom sheet 44, having its opposite ends affixed to the side frame members 32 and 34 or welded to the bottom sheet to be held in wedging relationship within the tapered structure.

Figure 4:
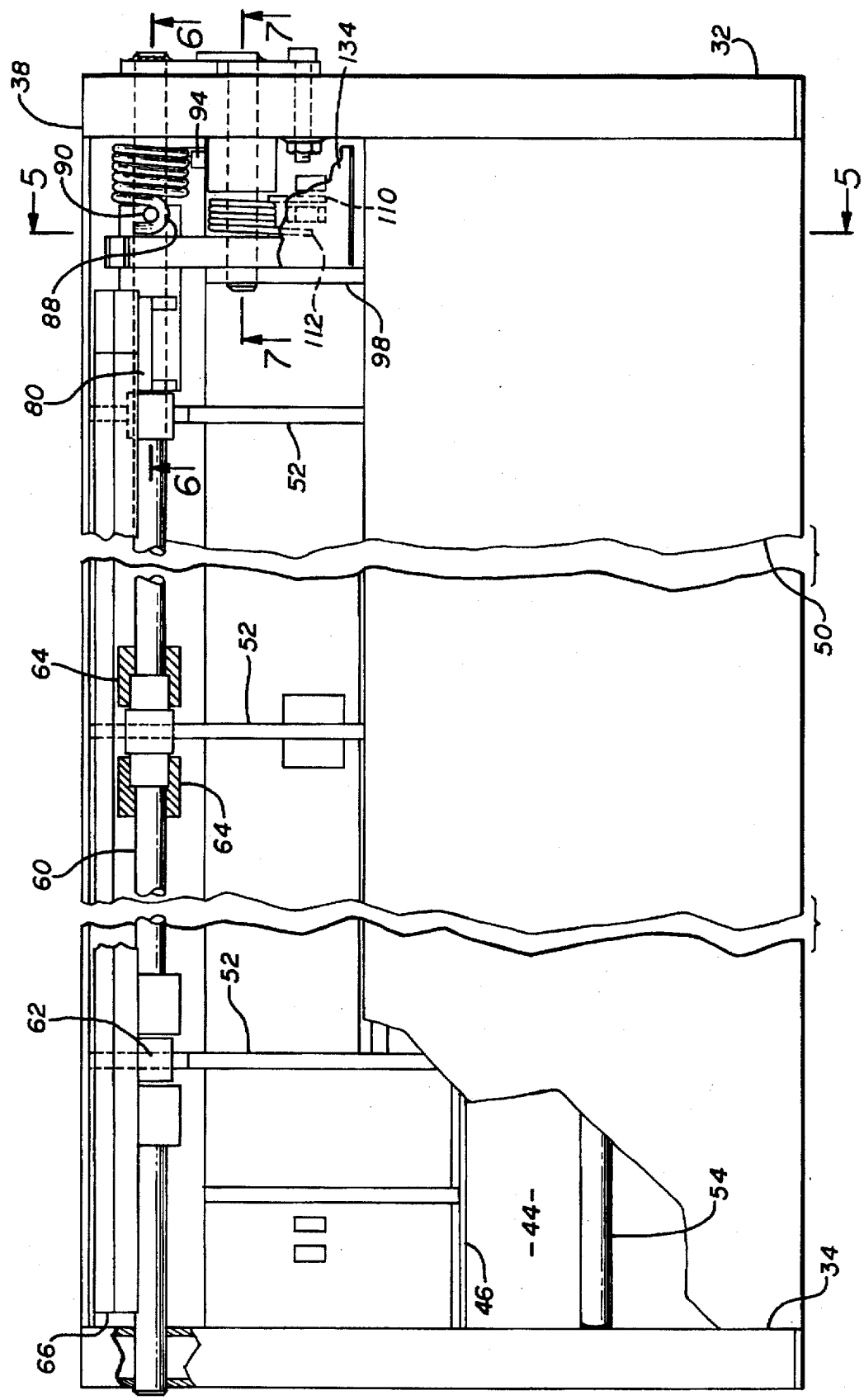
FIG. 4 is a partly broken top plan view of the loading ramp with the cart stop in the active position, parts being broken away to show interior details of construction.

As is best seen in FIG. 4, an elongate cart stop support rod 60 is mounted internally within the forward edge portion of the assembly 30 within the flanges of the angle iron 36, as by having each of its opposite ends secured through aligned holes formed through opposing sidewalls of the side frame members 32 and 34. At spaced intervals therealong, the support rod 60 is also supported by a plurality of coaxial sleeves 62, each of which is in turn affixed to a shoulder at the forward end of one of the internal ribs 52. At spaced intervals therealong, the support rod 60 coaxially rotatably mounts pairs of preferably self-lubricating bearings 64 disposed at opposite ends of a sleeve 62. Each of the bearings 64 has a peripheral portion rigidly affixed, as by welding, to the underside of an elongate substantially rectangular cart stop member, such as plate 66. As is best seen in FIG. 1, the dimensions of the cart stop plate are such as to substantially fully occupy the gap between the forward edge of the ramp plate 50 and the upper end of the flange 38 of the angle iron 36. The cart stop plate 66 is also preferably provided with a diamond plate finish on its upper surface and, when in the retracted position, is essentially co-planar with the ramp plate 50 to provide a substantially continuous ramp sloping upwardly from the rear edge of the sub-assembly 30.

Figure 3:
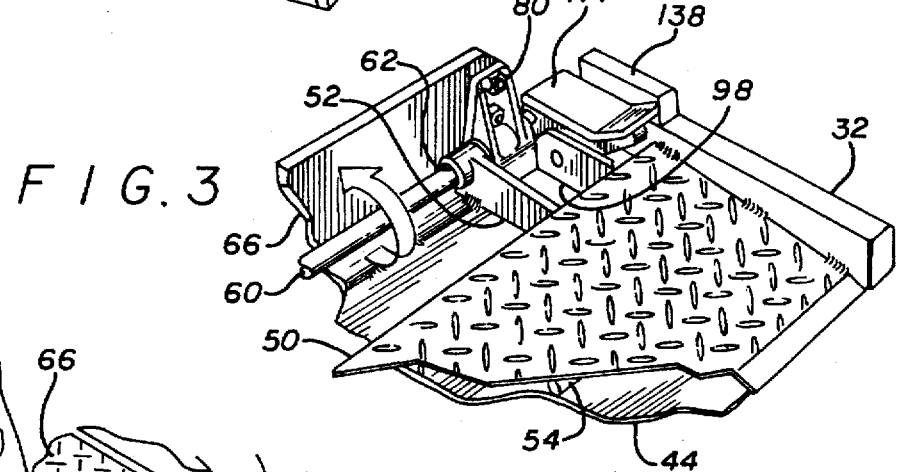
FIG. 3 is a partial perspective view showing the cart stop in an active or barrier-defining position.
Figure 5:
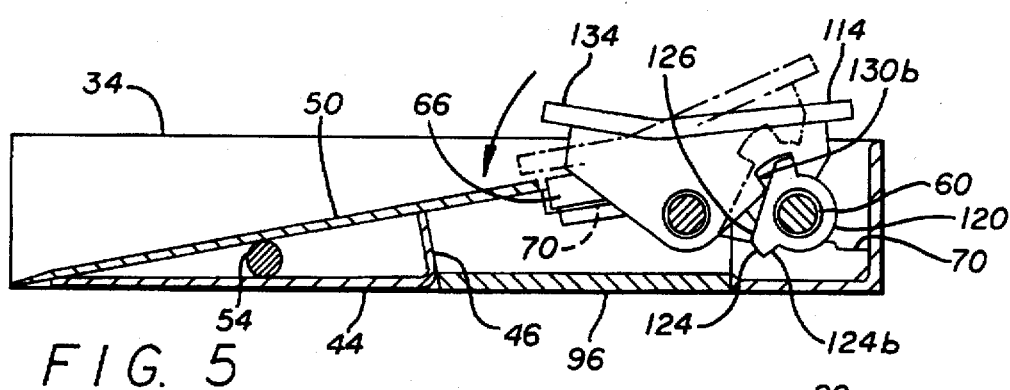
FIG. 5 is a sectional view on the line 5—5 of FIG. 4.
Figure 6:
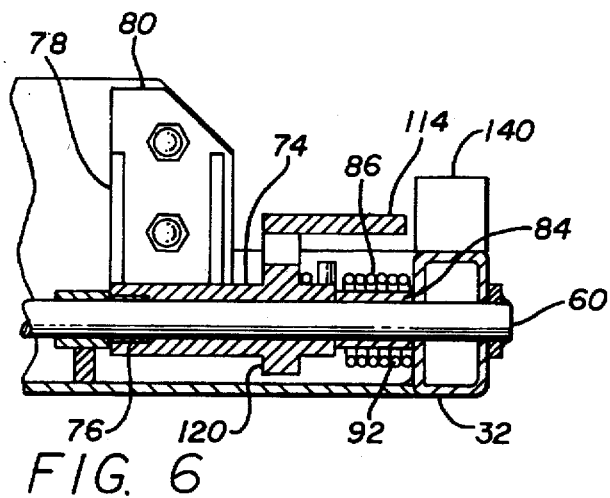
FIG. 6 is a sectional view on the line 6—6 of FIG. 4.
Figure 8:
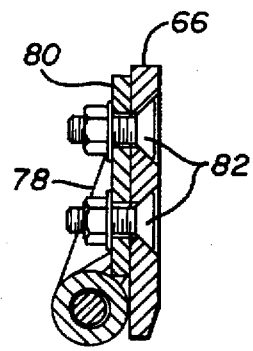
FIG. 8 is a transverse section through the cart stop component.

As shown in FIG. 5, each of the ribs 52 in its forward portion is formed with a reduced height step shoulder 70, the array of stepped shoulders providing clearance for the cart stop plate 66 in retracted and erect conditions. Preferably at the curb side of the assembly, one end of the support rod 60 coaxially rotatably mounts a cylindrical body 74 having self-lubricating bearings 76 at its opposite ends. An inner end portion of the body 74 is externally rigidly fitted with a parallel spaced apart pair of radially projecting gusset plates 78, to parallel edges of which is affixed a cart stop drive plate 80. The plate 80 is rigidly secured, as by a pair of lock nut fastener means 82, to the corresponding end of the cart stop plate 66. As is shown in FIG. 6, a coaxial reduced diameter outer end portion 84 of the cylindrical body 74 is coaxially surrounded by a torsion spring 86. One end 88 of the torsion spring is hooked around a pin 90 projecting radially from the body 74, while the other end 92 of the spring is anchored by a relatively fixed member 94. The cart stop plate 66 is thus normally biased into the upstanding position illustrated in FIG. 3, in which it is arrested by contact of its face against flange 38 of angle iron 36.

Rearwardly adjacent to the cylindrical body 74, an angle bracket 96 is welded on opposite edges of its bottom flange between the sheet 44 and bottom flange 40 of angle iron 36. An upstanding flange 98 oriented parallel to the adjacent side frame member 32 to support one end of a pin 100 whose other end is mounted through aligned bores formed through parallel sidewalls of the side frame member. The pin 100 passes through a coaxial spacer 102 secured to the inner face of the side frame member 32 as by welding. Inwardly of the spacer 102, the pin 100 coaxially supports a bearing sleeve 104 whose inner end is integrally joined to one side of a rocker plate 106 also mounted on the pin 100 for oscillatory rotation with the sleeve 104. Externally, the bearing sleeve 104 coaxially mounts a torsion spring 108, one end of which is relatively fixed as at 110. Secured to an upper edge of the plate 106 is a generally horizontally disposed pedal plate 114 against whose underside the other end 112 of the torsion spring 108 is pressed. The plate 106 and pedal plate 114 are thus normally biased in a clockwise direction as viewed in FIGS. 5 and 5a.

The cylindrical body 74 is integrally formed with a coaxial pawl portion 120 disposed in a co-planar orientation with the rocker plate 106. The pawl 120 has an angularly spaced apart pair of radially projecting lobes 122 and 124 concentric with the support rod 60, the pair of lobes being spanned by a clearance flat 126. A portion of the rocker plate 106, forwardly of its axis of rotation, is formed on its underside edge with a detent notch 130 that is alternatively engagable with either the pawl lobe 122 or the lobe 124.

More particularly, the radius of rotation of the mid-point of the root of the detent notch 130, around the pin 100, is substantially the same as the center-to-center spacing between the pin 100 and support shaft 60. The lobes 122 and 124 of the pawl are alternatively engagable with the opposite sides 130a or 130b of the detent notch 130. Thus, in the relative position of the parts shown in solid outline in FIG. 5, the side 130a of the detent notch is engaged by a complementary side 122a of the pawl lobe 122 to hold the cart stop plate 66 in a retracted position. In the relative position of the parts shown in FIG. 5a, the side 130b of the detent notch is engaged by a complementary side 124b of the pawl lobe 124 so that a counter-clockwise force on the erected cart stop plate is arrested and prevented from forcing the cart stop plate back to a retracted position. As can be seen from inspection of the drawings, the pawl flats 122a and 124b are oriented relative to the support rod 60 to provide positive stops to hold the cart stop plate in the desired retracted or erect position.

A rear end portion 134 of the pedal plate 114 is inclined upwardly relative to a flat portion situated forwardly of the pin 100. The rear edge of the pedal portion 134 overhangs the front edge of the ramp plate 50 which thus serves as a positive stop to limit depression of the pedal to the dotted outline condition illustrated in FIG. 5, i.e., just sufficiently to allow clearance for rotation of the lobes 122 and 124 and clearance flat 126 of the pawl 120 past the raised detent notch 130.

Figure 7:
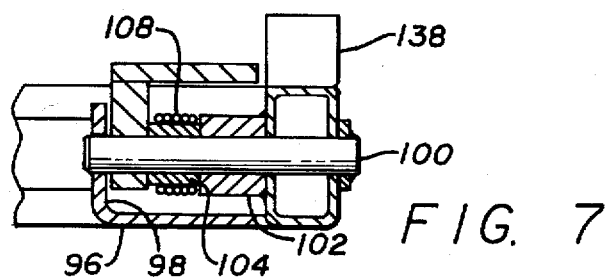
FIG. 7 is a sectional view on the line 7—7 of FIG. 4.

In order to avoid inadvertent erection of the cart stop (such as when the lift 12 is in a collapsed or folded condition in backing against a loading dock), a guard block 138 may be mounted adjacent to the pedal 114. Preferably, this guard means takes the form of a block of about the length of the pedal and secured to the upper surface of the curb side frame member 32. As is best seen in FIGS. 6 and 7, the block 138 has a surface 140 protruding above the top surface of the side frame member 32 to a greater extent than the rear edge of the pedal portion 134 whereby an inward force is engaged by the surface 140 before the pedal can be depressed.

Figure 2:
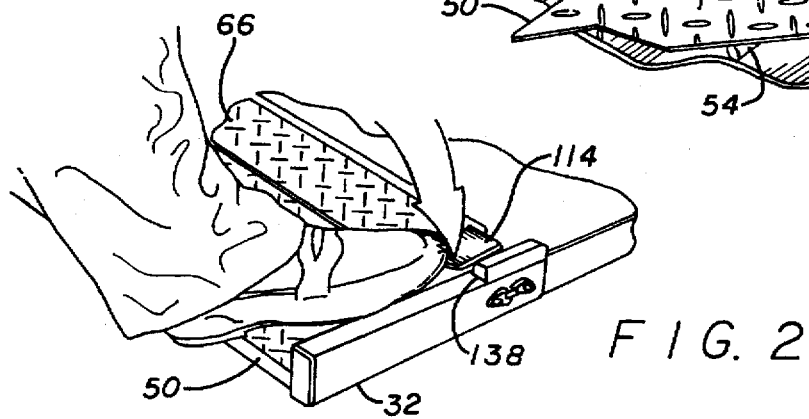
FIG. 2 is a partial perspective view of the curb side portion of the loading ramp schematically showing the manner of driver operation of the device to release the cart stop from a retracted position.

The operation of the cart stop is as follows. Assuming the latch means parts to be in the solid outline condition of FIG. 5, and assuming the loading situation indicates an election to use the cart stop, the operator's toe is used to depress the pedal portion 134 in the manner indicated in FIG. 2. Side 130a of the detent notch 130 is thereby lifted off of side 122a of the lobe 122 of the pawl 120. Biasing means 86 then rotates cart stop plate 66 into an erect position until the face of the plate engages the upper edge of the vertical flange 38 of the angle iron 36. The lobe 124 of the pawl 120 is correspondingly rotated so that upon subsequent release of foot pressure on the pedal 114, the detent notch 130 is brought into approximate registration with the lobe 124.

Figure 5A:
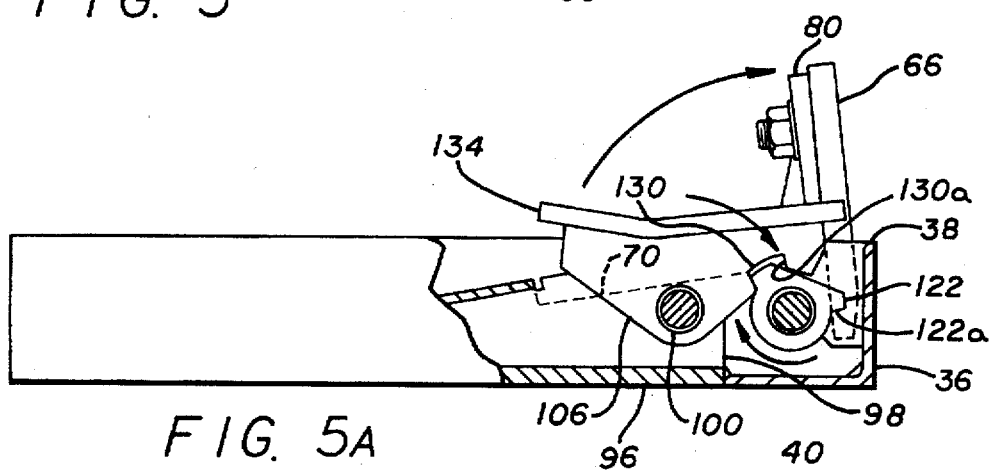
FIG. 5a is an elevation similar to FIG. 5, but with portions broken away to show parts in different relative positions.

Thereafter, when the force of a wheeled cart (or some other force) is brought to bear against the face of the erect cart stop, the cart stop and pawl 120 may be counter-rotated to the position shown in solid outline in FIG. 5a. Thus, side 130b of the detent notch 130 prevents further rotation of the pawl 120 and cart stop plate 66 towards the retracted position.

When it is desired to retract the cart stop, the portion 134 of the pedal 114 is again depressed to retract side 130b of the detent notch from engagement with side 124b of the pawl lobe 124. The operator's other foot is then used against the outer edge of the cart stop plate 66 to force and hold it into the retracted position. The lobe 122 of the pawl 120 having been brought into a position of registration with the detent notch, the operator's first foot then releases the pedal 114 so that side 130a of the detent notch engages side 122a of the pawl lobe 122 to lock the cart stop plate into retracted position. The other foot of the user is then removed.

An alternative embodiment of ramp section sub-assembly 30' is shown in FIGS. 9 and 10. Its framework is essentially the same as that of the first embodiment comprising an angle iron front frame 36, opposite side frame members 32 and 34, bottom sheet 44, parallel laterally spaced apart fore- and -aft oriented ribs 52 and ramp plate 50. However, in lieu of the single cart stop plate 66 of the first embodiment, the alternative embodiment has a side-by-side pair of ramp plates 140 and 142.

Each of the cart stop plates 140 and 142 spans approximately one-half the distance between the opposite side frame members 32 and 34. While each of the cart stop members is mounted on the support rod 60 in the same manner as before, through rod-supported bearings 64 secured to the underside of the corresponding plate, each of the plates is turnable between retracted and erect positions independently of the other.

More specifically, the right hand or curb side cart stop plate 140 is regulated by the same spring-loaded latching mechanism described in detail in connection with the first embodiment. The left hand or driver's side cart stop plate 142 is regulated by an identical but mirror image spring-loaded latching mechanism whose parts are correspondingly numbered with the addition of a prime. Thus, the left hand pedal is identified as 114'. To reinforce the adjacent inner ends of the cart stop plates 140 and 142 when in the retracted position and loads are being passed across the ramp section, the central rib 52 has reinforcing blocks 146 secured to the opposite sides thereof to engage the underside of the corresponding plate.

As will now be evident, each of the cart stop plates 140 and 142 is independently foot-actuatable through its corresponding latch mechanism in precisely the same fashion as the cart stop plate 66 of the first embodiment. Thus, when an occasion arises and it is desired to securely retain one wheeled cart on one side of the load platform, while another wheeled cart is moved across the loading ramp on the other side of the platform, only that cart stop for the first platform side is actuated to pop up into cart stop position. The ramping integrity of the other side of the platform is thus maintained for ease of wheel transition between ground level and the load-bearing surface of the platform. As will be apparent, both cart stops 140 and 142 can be sequentially actuated to stand in the erect position when needed as, for example, in transition of a load between truck bed 14 and the ground level.

I claim:

1. A lift platform comprising:

a platform having a pair of elongate stop members, each of said stop members being mounted on said platform for movement between a retracted position and a stop position wherein said stop member confronts a load-bearing surface of said platform, each of stop members being movable between said two positions independently of the other of said stop members; and a pair of latch means, each comprising cooperating parts of one of said stop members and said platform, for independently latching each of said stop members against movement from said stop position toward said retracted position or alternately independently latching each of said stop members against movement from said retracted position toward said stop position, one of said cooperating parts being movable out of latching contact with the other of said cooperating parts for releasing said member for movement between said retracted position and said stop position.

2. A lift platform as in claim 1 in which:

each of said stop members is a plate and each of said pair of plates comprises a forward portion of a ramp section of said platform, each of said plates being pivotally mounted in said ramp section for rotation between said retracted and stop positions, each of said plates comprising a ramping surface of said ramp section when in said retracted position.

3. A lift platform as in claim 2 wherein:

each of said cooperating parts comprise a pawl carried by the corresponding one of said stop members and a detent mounted on said platform in operative alignment with said pawl for movement into and out of engagement with said pawl, said pawl having a spaced apart pair of lobes alternatively engagable with said detent in said retracted and stop positions of the corresponding one of said stop members.

4. A lift platform as in claim 3 in which:

each of said stop members has biasing means whereby each of said stop members is normally biased into said stop position, and each of said detents has a biasing means whereby each of said detents is normally biased into engagement with a corresponding one of said pawls, each of said detents having an actuator portion for selective actuation of said detent into and out of operative engagement with said lobes of the corresponding one of said pawls.

5. A lift platform as in claim 4 in which:

each of said actuator portions comprises a foot-engagable pedal mounted at a side of said lift platform.

6. A lift platform as in claim 5 in which:

said pair of stop members are arranged side-by-side to linearly extend along a rear edge of said platform.

7. In a lift platform, the improvement, in combination with said platform, comprising:

a ramp section rigidly integrated with an edge of said platform;

a stop member movably mounted on said ramp section along said platform edge;

said member being movable between a stop position in which said member confronts a load-bearing surface of said platform and a retracted position, said member when in said retracted position comprising a ramping surface; and a latch means carried by said ramp section and said stop member, said latch means comprising cooperating parts of said member and of said ramp section, one of said cooperating parts being movable out of latching contact with the other of said cooperating parts for releasing said member for movement between retracted position and said stop position, said latch means being operable for latching said stop member against movement from said stop position toward said retracted position and for latching said stop member in said retracted position.

8. A lift platform as in claim 7 in which:

said cooperating parts comprise a pawl carried by said stop member and a detent mounted on said ramp section in operative alignment with said pawl for movement into and out of engagement with said pawl, said pawl having a spaced apart pair of lobes alternatively engagable with said detent in said retracted and stop positions of said stop member.

9. A lift platform as in claim 8 in which:

said stop member has a biasing means whereby said stop member is normally biased into said stop position, and said detent has a biasing means whereby said detent is normally biased into engagement with said pawl, said detent having an actuator portion for selective actuation of said detent into and out of operative engagement with said lobes of said pawl.

10. A lift platform as in claim 9 in which:

said actuator portion comprises a foot-engagable pedal mounted at a side of said ramp section.

11. A lift platform as in claim 8 in which:

said stop member comprises a plate that is pivotally mounted along a forward edge of said ramp section and coaxially mounts said pawl for co-rotation therewith;

said detent being pivotally mounted on said ramp section on a pivot axis parallel to that of said pawl and plate.

12. A ramp section for a lift platform comprising:

a substantially rectangular framework having a transverse front frame member to be connected to a rear edge frame member of the platform;

an elongate stop member movably mounted along said front frame member for a movement between retracted and stop positions of said stop member;

a foot-operable means for effecting movement of said stop member from said retracted position to said stop position; and a latch means for latching said stop member against movement from said stop position toward said retracted position, said latch means comprising cooperating parts of said member and of said framework, one of said cooperating parts being movable out of latching contact with the other of said cooperating parts for releasing said member for movement between said retracted position and said stop position.

13. A ramp section as in claim 12 in which:

said foot-operable means comprises a means for biasing said stop member into said stop position.

14. A ramp section as in claim 13 in which:

said latch means comprising said foot-operate means.

15. A ramp section for a lift platform, said ramp section comprising:

a frame comprising a transversely disposed front edge frame member having a pair of opposite side frame members secured to opposite ends thereof;

a substantially rectangular ramp plate having opposite ends rigidly secured to said side frame members, said ramp plate having a ground-engagable rear edge from which said plate inclines upwardly forwardly toward said front frame member;

a substantially rectangular stop plate movably mounted on said ramp section adjacent to said front frame member for movement between retracted and stop positions, said stop plate in said retracted position comprising a substantially flush forward continuation of said ramp plate between a forward edge of said ramp plate and said front edge frame member, said stop plate in said stop position being disposed substantially vertically; and a latch means operatively connected to said stop plate for latching said stop plate against movement from said stop position towards said retracted position or alternately latching said stop plate against movement from said retracted position towards said stop position, said latch means comprising cooperating parts of said stop plate and of said ramp section, one of said cooperating parts being movable out of latching contact with the other of said cooperating parts for releasing said stop plate for movement between said retracted position and said stop position.

16. A ramp section as in claim 15 in which:

said stop plate is pivotally mounted for movement between said retracted and stop positions;

said cooperating parts comprising a pawl carried by said stop plate and a detent operative alignment with said pawl for movement into and out of engagement with said pawl, said pawl having a spaced apart pair of lobes alternatively engagable with said detent in said retracted and stop positions of said stop plate.

17. A ramp section as in claim 16 in which:

said stop plate and said pawl are coaxially and pivotally mounted; and said detent is pivotally mounted on a pivot axis parallel to that of said stop plate and said pawl;

said stop plate having a biasing means whereby said stop plate is normally biased into said stop position and said detent having a biasing means whereby said detent is normally biased into operative engagement with said pawl.

18. A ramp section as in claim 17 in which:

said latch means is mounted at one of said opposite side frame members;

said detent being surmounted by a depressable integral pedal for foot actuation of said detent.

19. A ramp section as in claim 18 in which:

a forward edge of said ramp plate and a portion of said pedal are mounted in interfering alignment whereby said ramp plate limits depression of said pedal portion and rotation of said detent relative to said pawl.

20. A ramp section as in claim 19 in which:

a guard block is secured adjacent to said pedal, said guard block having a surface protruding above said pedal sufficiently to prevent inadvertent depression of said pedal.

* * * * *